A. F. ROCKWELL.
EQUALIZING DEVICE.
APPLICATION FILED FEB. 23, 1906.
962,252.
Patented June 21, 1910.
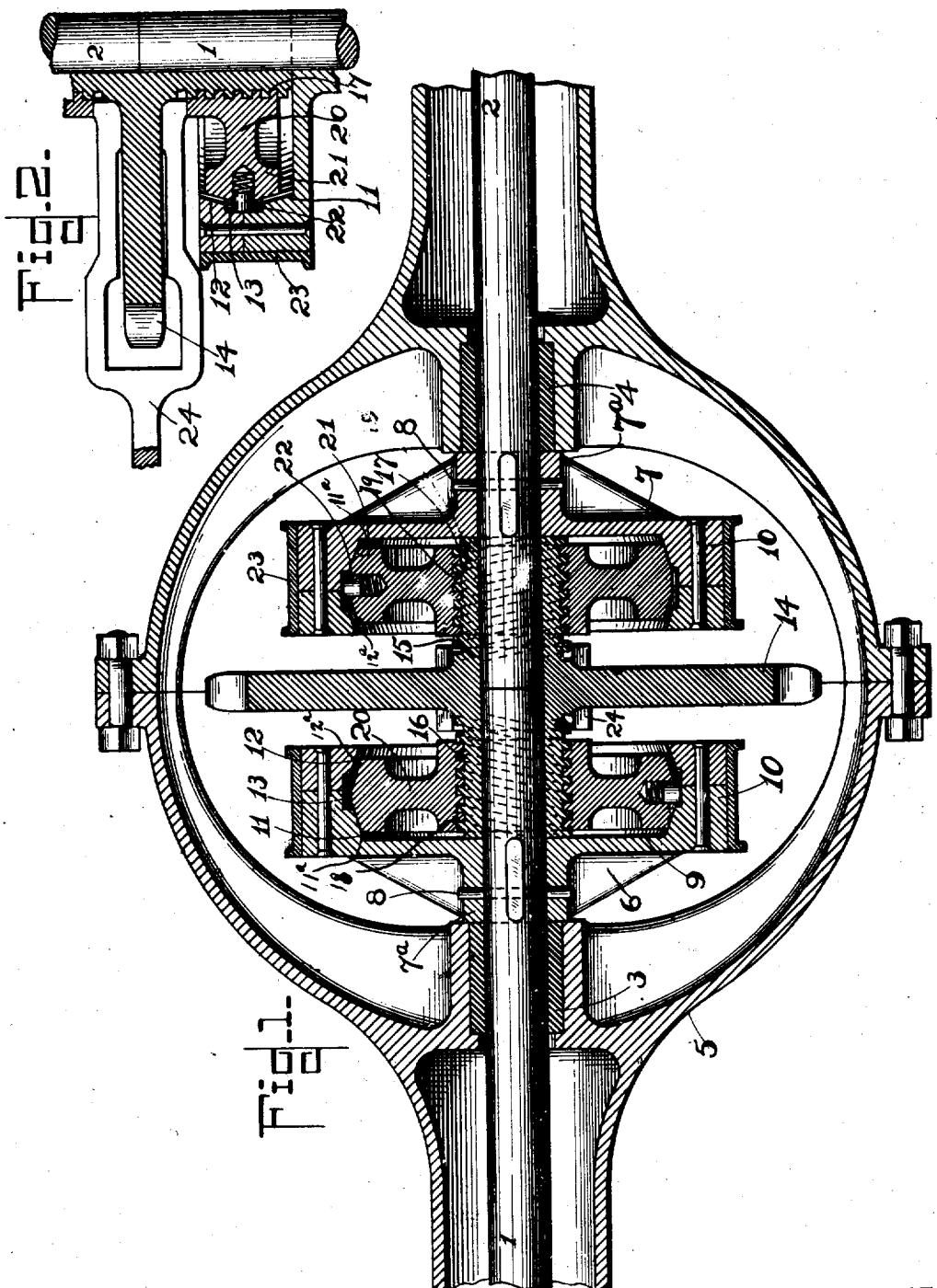
WITNESSES:
Chas. B. Crocker.
B. F. Funk
INVENTOR.
Albert F. Rockwell.
BY
ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

EQUALIZING DEVICE.

962,252.  Specification of Letters Patent.  Patented June 21, 1910.

Application filed February 23, 1906. Serial No. 302,527.

*To all whom it may concern:*

Be it known that I, ALBERT F. ROCKWELL, a citizen of the United States, residing at Bristol, county of Hartford, State of Connecticut, have invented a certain new and useful Equalizing Device, of which the following is a full, clear and exact description, such as will enable others skilled in the art to which it appertains to make and use the same, reference being had to the accompanying drawings, forming part of this specification.

This invention relates to a driven or power transmitting means wherein power may be conveniently transmitted from a drive element to a driven element by means of an automatically operable connecting member.

Another object of my invention is to provide the equalizing mechanism for two movable parts (as for example the two alining members of a split axle) whereby one part may move faster than the other and whereby both parts may coast at the same speed depending upon the conditions under which the parts are operating.

Another object of the invention is to provide means whereby the driven member will be operably connected to the drive member so long as the drive member is rotating at a speed as great or in excess of the speed of the driven member the arrangement being such that when the driven member moves faster than the drive member the drive and driven member will be disconnected and it will be permitted to move independently of the drive member.

Another object is to provide means whereby two alining rotatable drive elements may be rigidly connected together, so that under certain conditions both of said alining elements will rotate together, while under other conditions one of said elements may rotate at a speed in excess of speed of the other.

Another object is to provide a suitable mechanism for driving the drive axle of the vehicle, so that when the propelling mechanism is properly operated to drive the axle said propelling mechanism will be connected to said drive axle to impart motion thereto, but as soon as the propelling mechanism ceases to operate, or in the event of the drive axle rotating faster than the element which is provided to impart motion thereto, the propelling mechanism and drive axle will be automatically disconnected.

Other objects and advantages as well as novel details of construction of this invention will be apparent from the following description as the nature of the invention is better understood, it being obvious that changes in form, proportion and minor details of construction may be resorted to without departing from the spirit of the invention or sacrificing any of the advantages thereof.

In the drawings Figure 1 is a vertical, transverse, sectional view through a mechanism constructed in accordance with my invention, and Fig. 2 is a fragmentary sectional view of the drive element and the connector for connecting the driven and drive element and the means for holding the connector in its neutral and operative positions.

In order to convey the proper conception of the generic features of my invention, I have illustrated it as being applied to a motor vehicle in which a split axle is employed for driving the wheel thereof. The split axle in the present instance consists of two alining members designated by the reference numerals 1 and 2 respectively. These axle members are journaled in the thrust bearings 3 and 4 carried by the frame 5. Rigid on the respective axle members 1 and 2 are clutch members 6 and 7. Each clutch member is here illustrated as comprising a sleeve or collar 7ª through which passes a key 8 to prevent rotatory movement of the collar with respect to its particular axle member. A web 9 is carried by each collar and on the periphery of each web is an annulus 10. Each annulus is provided with oppositely inclined, internally arranged clutch faces 11 and 12, spaced by an annular groove 13. The clutch members 6 and 7 are spaced apart to permit the application of a drive element illustrated as a sprocket or gear, as the case may be, here designated by the numeral 14. The drive element is provided with a sleeve or hub 15 which is oppositely threaded as at 16 and 17. The threads on the external portions of said hub or sleeve engage with internal threaded portions 18 and 19 of the clutch members 20 and 21 which are adapted to have sidewise movement imparted thereto in opposite directions when the drive element moves. The peripheries of the clutch elements 20 and 21 are provided with oppositely inclined clutch faces 11ª and 12ª to frictionally engage the clutch faces 11 and 12 of the clutch members 6 and 7 according to the directions of rotation of the drive element 14.

22 are friction elements which are carried by the clutch elements 20 and 21, said friction elements 22 being adapted to contact with the surface of the grooves 13 as will be explained hereinafter.

In the form illustrated in the drawing the axle members 1 and 2 aline, so that their ends are in contact with each other. If the drive member is rotated in a forward direction the friction elements 22 will contact sufficiently with the surface of the groove 13, so that the clutch elements 20 and 21 will be prevented from rotating, or at least the rotation of the clutch elements 20 and 21 will be retarded sufficiently to permit a sidewise movement being imparted to each of them through the medium of the threaded sleeve or hub 15, so that the clutch members 20 and 21 will be drawn toward the element 14 to contact with the clutch face 12 of the clutch members 6 and 7 and thereby lock the drive element and the driven element together. The movements of the clutch elements just designated will result in causing the end thrust to be resisted by the ends of the axle members or shafts 1 and 2 and the ends of the hub 15. So long as the motion of the drive member 14 advances in a forward direction the axle members 1 and 2 will be rotated in a forward direction. If however, the drive element is reversed, sidewise movements will be imparted to the clutch members 20 and 21, so as to cause them to engage the clutch face 11 of the clutch members 6 and 7 and thereby impart motion to the shaft or axle in a rearward direction. These movements will continue so long as the vehicle is traveling in a straight path. If, however, the wheels are describing an arc, so that it becomes necessary for the outer wheel to travel faster than the inner wheel, the difference in the relative movements of the outer and inner wheel shaft will be such that the outer clutch carried by one of the shaft or axle members will be permitted to run free providing in effect what is commonly termed a differential connection. If the vehicle is passing down an inclined plane or if in any case the axle or shaft members 1 and 2 are permitted to run faster than the drive element 14, the clutch members 20 and 21 will be promptly thrown out of frictional engagement with the clutch members 6 and 7, so that members 1 and 2 may run free permitting the vehicle to "coast" or the shaft or shafts to become disconnected from the driving mechanism. This latter described action will be conveniently accomplished during the movement either rearward or forward.

In view of the fact that I have provided means for coasting, I find it expedient to provide a brake mechanism for retarding the movement of the clutch members 6 and 7 and thereby retard the movement of the members 1 and 2. A simple device for braking these elements is illustrated as comprising a band brake 23 which passes around the peripheries of the clutch elements 6 and 7. The band brakes may be operated in any preferred manner, and I have, therefore, deemed it unnecessary to specifically illustrate and describe any preferred form of brake mechanism.

In order to permit the drive element to run free without operating the driven element, I may introduce means for holding the clutch members 20 and 21 in neutral or inoperative positions, that is to say, I may find it expedient to introduce means whereby the clutch members 20 and 21 may be held out of operative engagement with the members 6 and 7. The neutralizing element 24 is herein shown as comprising a bifurcated member straddling the drive element 14 and adapted to be introduced between the ends of the clutch members 20 and 21, so that while the member 24 is positioned between said members 20 and 21, they will be prevented from contacting with either the member 6 or the member 7 in thus holding the members 20 and 21 out of engagement with the members 6 and 7.

By the construction just described, the motor together with the drive element may be permitted to run free, so as not to impart motion to the driven member or members. For example, if it is desired to start up the motor to ascertain whether or not it is running properly, or indeed to operate the motor for any cause without imparting movement to the driven member or members, this can be accomplished by introducing the element 24.

What I claim is:

1. A gearing including a drive member, a plural number of driven members, a clutch member rigid on each of said driven members, movable clutch members on said drive member for automatically engaging the said rigid clutch members during the rotation of the drive member in either a forward or a rearward direction, and means for preventing movement of the said movable clutch members; substantially as described.

2. A gearing including a plural number of driven members, a clutch member rigidly carried by each of said driven members, a drive member, clutch members carried by the drive member and having sidewise movement and adapted to engage the first-named clutch members at the limit of sidewise movement in either direction, and means for holding said second-named clutch members at an intermediate point between the limits of sidewise movements so as to permit the drive member to run free; substantially as described.

In testimony whereof, I hereunto affix my signature, in the presence of two witnesses.

ALBERT F. ROCKWELL.

Witnesses:
CHAS. F. SCHMELZ,
B. F. FUNK.

---

It is hereby certified that in Letters Patent No. 962,252, granted June 21, 1910, upon the application of Albert F. Rockwell, of Bristol, Connecticut, for an improvement in "Equalizing Devices," an error appears in the printed specification requiring correction as follows: Page 1, line 39, the word "drive" should read *driven;* and that the said Letters Patent should be read with this correction therein that the same may conform to the record of the case in the Patent Office.

Signed and sealed this 12th day of July, A. D., 1910.

[SEAL.]

C. C. BILLINGS,

*Acting Commissioner of Patents.* drive member, clutch members carried by the drive member and having sidewise movement and adapted to engage the first-named clutch members at the limit of sidewise movement in either direction, and means for holding said second-named clutch members at an intermediate point between the limits of sidewise movements so as to permit the drive member to run free; substantially as described.

In testimony whereof, I hereunto affix my signature, in the presence of two witnesses.

ALBERT F. ROCKWELL.

Witnesses:
CHAS. F. SCHMELZ,
B. F. FUNK.

---

It is hereby certified that in Letters Patent No. 962,252, granted June 21, 1910, upon the application of Albert F. Rockwell, of Bristol, Connecticut, for an improvement in "Equalizing Devices," an error appears in the printed specification requiring correction as follows: Page 1, line 39, the word "drive" should read *driven;* and that the said Letters Patent should be read with this correction therein that the same may conform to the record of the case in the Patent Office.

Signed and sealed this 12th day of July, A. D., 1910.

[SEAL.]

C. C. BILLINGS,

*Acting Commissioner of Patents.*

It is hereby certified that in Letters Patent No. 962,252, granted June 21, 1910, upon the application of Albert F. Rockwell, of Bristol, Connecticut, for an improvement in "Equalizing Devices," an error appears in the printed specification requiring correction as follows: Page 1, line 39, the word "drive" should read *driven;* and that the said Letters Patent should be read with this correction therein that the same may conform to the record of the case in the Patent Office.

Signed and sealed this 12th day of July, A. D., 1910.

[SEAL.]

C. C. BILLINGS,

*Acting Commissioner of Patents.*